United States Patent
Rhodes (10) Patent No.: US 8,783,317 B1
(45) Date of Patent: Jul. 22, 2014

(54) METHOD AND APPARATUS FOR PRODUCING POLYMER SOLAR COLLECTORS AND HEAT EXCHANGERS

(71) Applicant: Richard O. Rhodes, San Francisco, CA (US)

(72) Inventor: Richard O. Rhodes, San Francisco, CA (US)

(73) Assignee: Richard O. Rhodes, San Francisco, CA (US)

( * ) Notice: Subject to any disclaimer, the term of this patent is extended or adjusted under 35 U.S.C. 154(b) by 0 days.

(21) Appl. No.: 13/829,402

(22) Filed: Mar. 14, 2013

(51) Int. Cl.
*H01B 13/016* (2006.01)
*B29C 53/08* (2006.01)

(52) U.S. Cl.
CPC .................................... *B29C 53/083* (2013.01)
USPC ............ 156/434; 156/425; 156/426; 156/430; 156/433; 156/436; 156/169; 156/173; 156/174

(58) Field of Classification Search
USPC ................. 156/184, 185, 187, 188, 191, 195, 156/244.11, 296, 446, 244.13, 350, 359, 156/433, 434, 169–175, 297, 425–428, 430, 156/431, 443, 308.2; 242/439, 440, 440.1, 242/441, 472.6, 473.3, 474.4, 475.7, 476.7, 242/472.5, 438
See application file for complete search history.

(56) References Cited

U.S. PATENT DOCUMENTS

| | | | | | |
|---|---|---|---|---|---|
| 3,616,070 | A | * | 10/1971 | Lemelson | 156/446 |
| 4,205,662 | A | | 6/1980 | Rhodes et al. | |
| 4,493,125 | A | * | 1/1985 | Collis | 15/167.2 |
| 4,547,641 | A | * | 10/1985 | Nebergall et al. | 219/765 |
| 4,681,720 | A | * | 7/1987 | Baumgart et al. | 264/150 |
| 5,698,066 | A | * | 12/1997 | Johnson et al. | 156/441 |
| 6,096,151 | A | * | 8/2000 | Edwards et al. | 156/174 |
| 6,206,994 | B1 | * | 3/2001 | Shieh et al. | 156/172 |
| 6,328,836 | B1 | * | 12/2001 | Ogawa | 156/117 |
| 2006/0137803 | A1 | * | 6/2006 | Suda | 156/117 |
| 2008/0093002 | A1 | * | 4/2008 | Steinke et al. | 152/528 |
| 2011/0214817 | A1 | * | 9/2011 | Kudo et al. | 156/397 |

* cited by examiner

*Primary Examiner* — John Goff
*Assistant Examiner* — Hannuri L Kwon
(74) *Attorney, Agent, or Firm* — Beyer Law Group LLP (57) ABSTRACT

A panel former is provided for producing a panel that is formed from polymer tubing for solar collectors, heat exchangers, and other devices. The panel former can receive the tubing and continuously wrap the tubing around a drum so that support members can be welded to the tubing. After the support members are welded to the tubing, the tubing can be cut along a line substantially parallel to the support members to remove the tubing from the panel former and to form the risers in a panel.

21 Claims, 12 Drawing Sheets

METHOD AND APPARATUS FOR PRODUCING POLYMER SOLAR COLLECTORS AND HEAT EXCHANGERS

BACKGROUND

The present invention relates generally to mechanism for producing panels of polymer tubing suitable for use in solar heat collection panels, heat exchangers, and other devices.

Solar heat collection panels and heat exchangers are used in a wide variety of applications and have a wide variety of geometries and designs for specific applications. Most often, heat exchangers are formed from a metal material such as copper, aluminum or stainless steel due to the favorable heat transfer characteristics that are displayed by such materials. Although metal heat exchanger designs work well for many applications, metals tend to be more expensive or more subject to corrosion than certain other materials, such as plastics. Thus, there are some applications where it is desirable to form a heat exchanger from lower cost polymer materials.

Solar heat collection panels have been used for a number of years to heat or preheat water and/or other fluids for a number of applications. One type of solar heat collection panel includes a series of riser tubes that extend in parallel between a pair of header pipes. The header pipes and risers can be formed from a wide variety of materials, but one class of heat exchangers use simple extruded plastic or elastomer tubing. When plastic tubing is used as the risers, adjacent tubes can be extruded, tack welded or supported together so that an array of side-by-side tubes forms a collection panel. A variety of plastics may be used to form the panels, although generally a dark, thermoplastic material is used. Such panels have been sold by FAFCO Inc. of Chico, Calif., and are described, for example, in U.S. Pat. No. 4,205,662.

As these existing solar panel designs work quite well, there are continuing efforts to develop new and improved methods and apparatuses for producing solar heat collection panels, heat exchangers, and other devices.

SUMMARY

According to an embodiment, a panel former is provided for producing a panel formed of polymer tubing. The panel former includes a drum, a rotatable arm, and a welding device. The drum has an outer surface around which polymer tubing can be wrapped. The rotatable arm has a carriage attached thereto such that when the arm rotates, the carriage travels around the outer surface of the drum to guide the polymer tubing around the drum. The welding device is configured to weld a plurality of polymer supports to polymer tubing wrapped around the drum. The polymer supports are oriented substantially orthogonal to the tubing.

According to another embodiment, a method is provided for producing a panel formed of polymer tubing. Polymer tubing is received and then wrapped around a drum. The tubing is then positioned around the drum under a positioner. A polymer support is then welded directly to an outer surface of the polymer tubing under the positioner.

According to yet another embodiment, a panel former is provided for producing a panel formed of polymer tubing. The panel former includes a drum and an outer ring. The drum has a tube positioner on an outer surface, and the outer ring has a plurality of clamps positioned thereon. A welding mechanism is positioned between each clamp and the drum.

BRIEF DESCRIPTION OF THE DRAWINGS

The invention, together with further objects and advantages thereof, may best be understood by reference to the following description taken in conjunction with the accompanying drawings in which.

It is to be understood that, in the drawings, like reference numerals designate like structural elements. Also, it is understood that the depictions in the figures are diagrammatic and not to scale.

DETAILED DESCRIPTION OF EMBODIMENTS

The present invention relates generally to producing solar heat collection panels, heat exchangers, and other devices formed from tube bundles for heating or preheating water and/or other fluids for a number of applications. As noted above, one type of solar heat collection panel or heat exchanger includes a series of side-by-side riser tubes between a pair of header pipes. These riser tubes can be either immediately adjacent one another or spaced apart from one another.

The header pipes and risers can be formed from a wide variety of materials. According to one embodiment, the risers are formed from extruded polymer tubing. When such tubing is used as the risers, adjacent tubes are supported together so that an array of side-by-side tubes forms a collection panel. A variety of plastics may be used to form the panels, although generally a dark, thermoplastic material is used.

Figure 1:
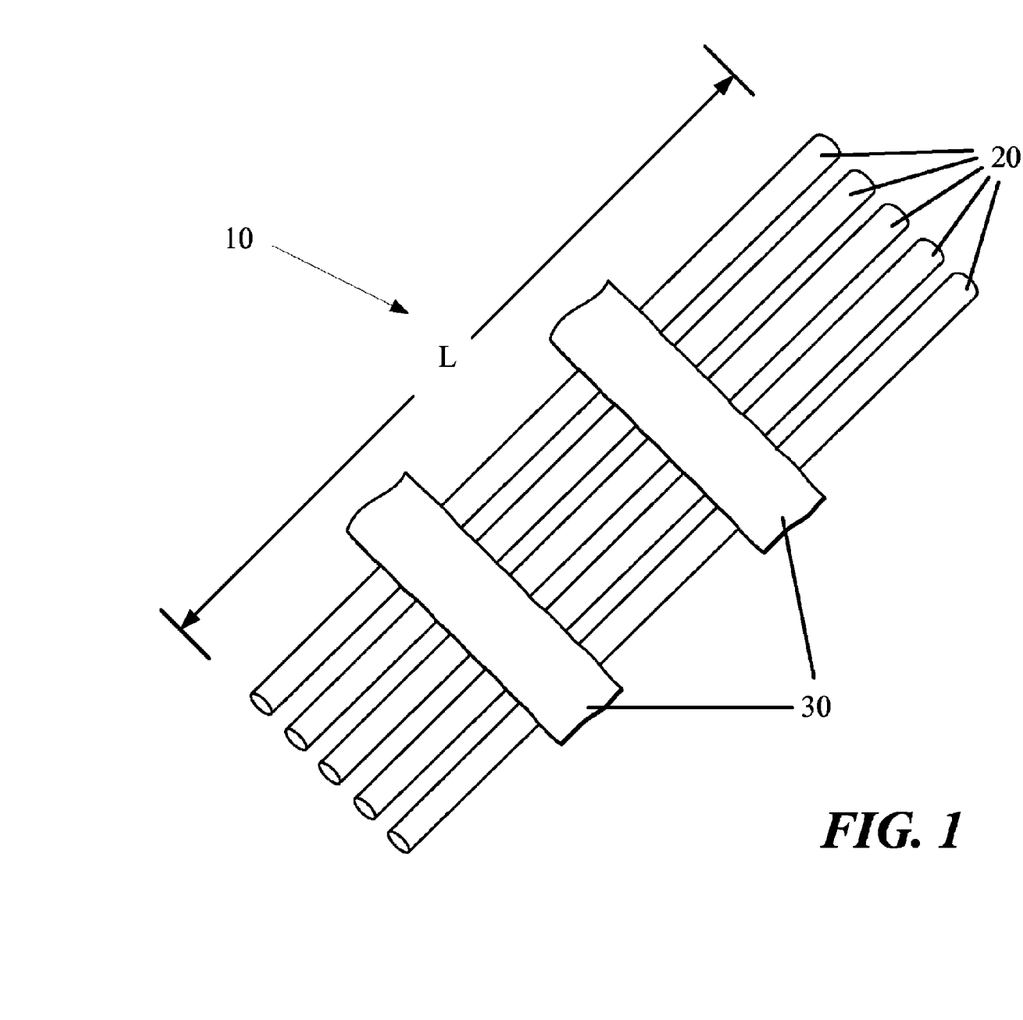
FIG. 1 is a perspective view of a portion of a solar collector panel formed in accordance with an embodiment.

Referring initially to FIG. 1, a portion of a panel in accordance with one embodiment of the invention will be described. In the illustrated embodiment, a panel 10 includes a bundle of polymer tubing 20. The tubing 20 can be formed of a variety of polymers, such as polyethylene and polypropylene. The tubes 20 form a sheet and are welded to supports 30 using conventional plastic welding techniques, such as impulse welding (heat sealing). The tubing 20, which form riser type fluid channels, and the supports 30 define the risers of a panel 10.

Methods and apparatuses for production of polymer panels 10 are described below. In various embodiments, the panel forming equipment may be arranged to continuously produce panels or tube bundles. The panel former welds transverse supports 30 to the top and/or bottom surface of the tubing bundles to form the panels 10. In the illustrated embodiment, the supports 30 are film strips (as shown in FIG. 1). In other embodiments, the supports 30 can be extruded solid or hollow core profile supports that can be welded onto the outer surface of the tubing 20.

The panel former receives polymer tubing 20 and wraps the tubing around a drum. The tubing 20 can be wrapped continuously such that a subsequent wrap of tubing 20 can be immediately adjacent or spaced a predetermined distance apart from a previous wrap of tubing 20. As a length of tubing 20 is wrapped around the drum, support strips 30 are welded to the tubing 20. In the illustrated embodiments, the support strips 30 are welded to the tubing 20 by the panel former at an angle that is substantially orthogonal to the direction of the tubes 20, as shown in FIG. 1, although that is not a requirement. After the strips 30 have been secured to a "wrap" or "hoop" of the tubing 20, a tube indexer on the panel former rotating arm indexes or pushes the tubing 20 down a predetermined distance during each rotation so that a subsequent length of tubing 20 can be wrapped around the drum and welded to the support strips 30. The tubing hoops can be fabricated either immediately adjacent one another or can be spaced apart.

The wrapping, welding, and indexing can be performed continuously by the panel former to form tubing hoops welded with support strips 30, as shown in FIG. 7. The hoops can then be sliced at a point in a direction substantially parallel to the support strips 30 to form a panel 10, as shown in FIG. 1.

Figure 2:
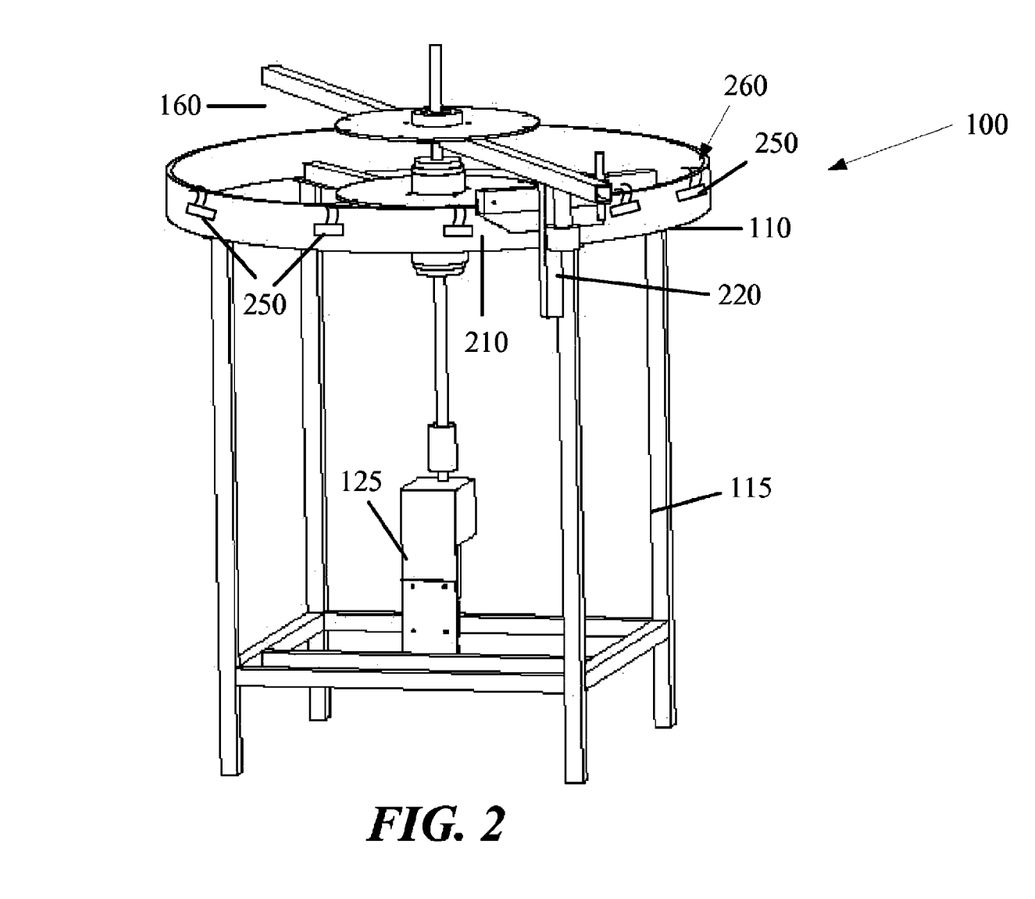
FIG. 2 is a perspective view of a panel former for forming solar collector panels in accordance with an embodiment.
Figure 3A:
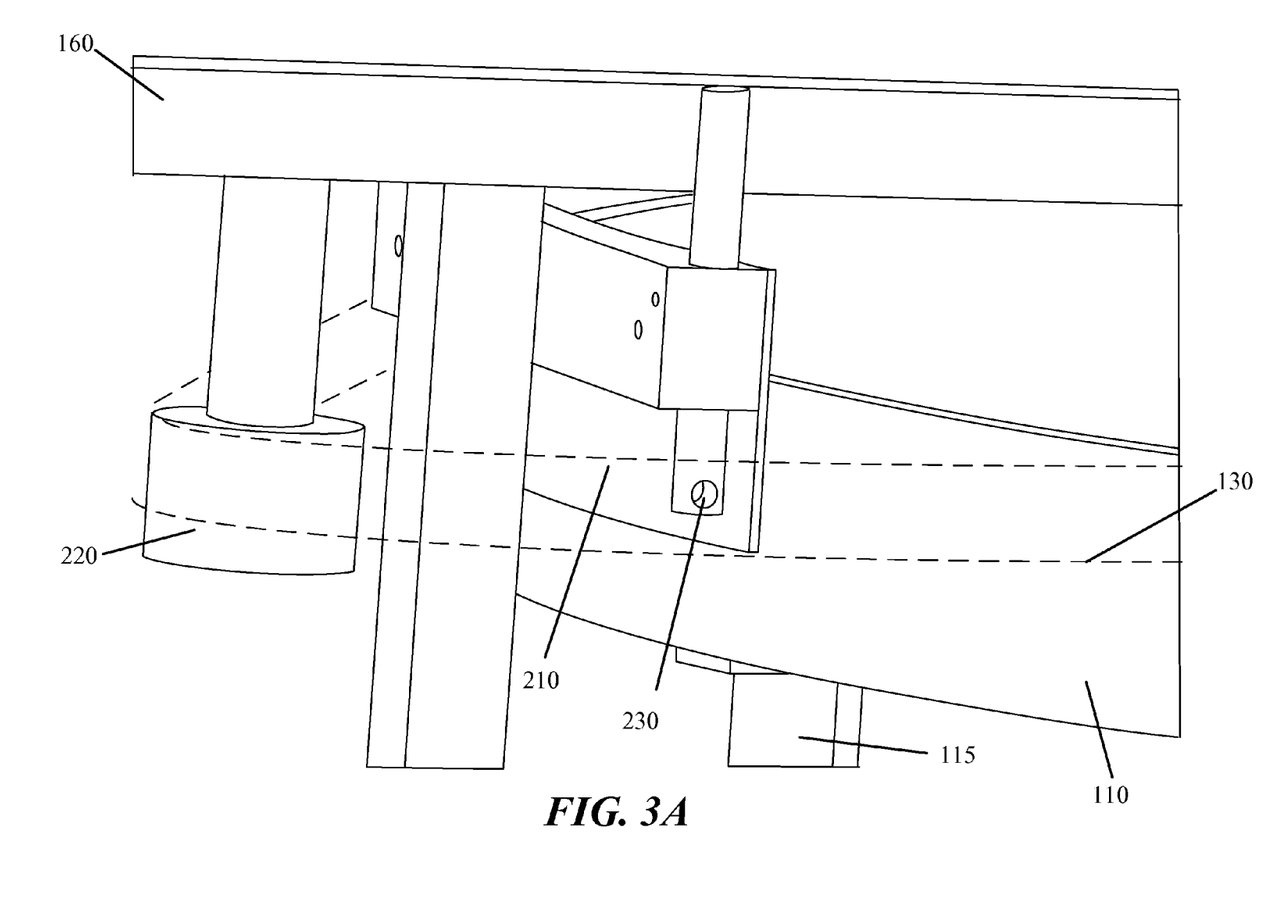
FIG. 3A is a detailed view of a portion of the panel former shown in FIG. 2.
Figure 3B:
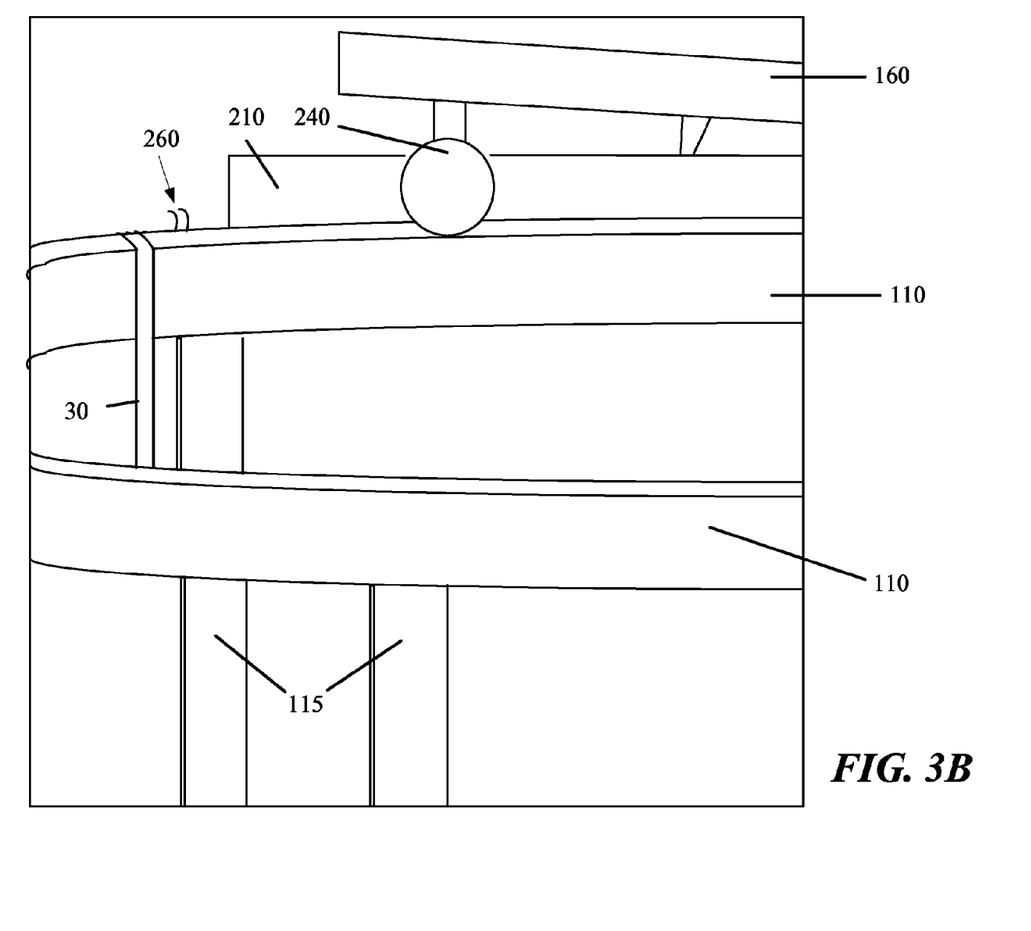
FIG. 3B is a detailed view of another portion of the panel former shown in FIG. 2.
Figure 3C:
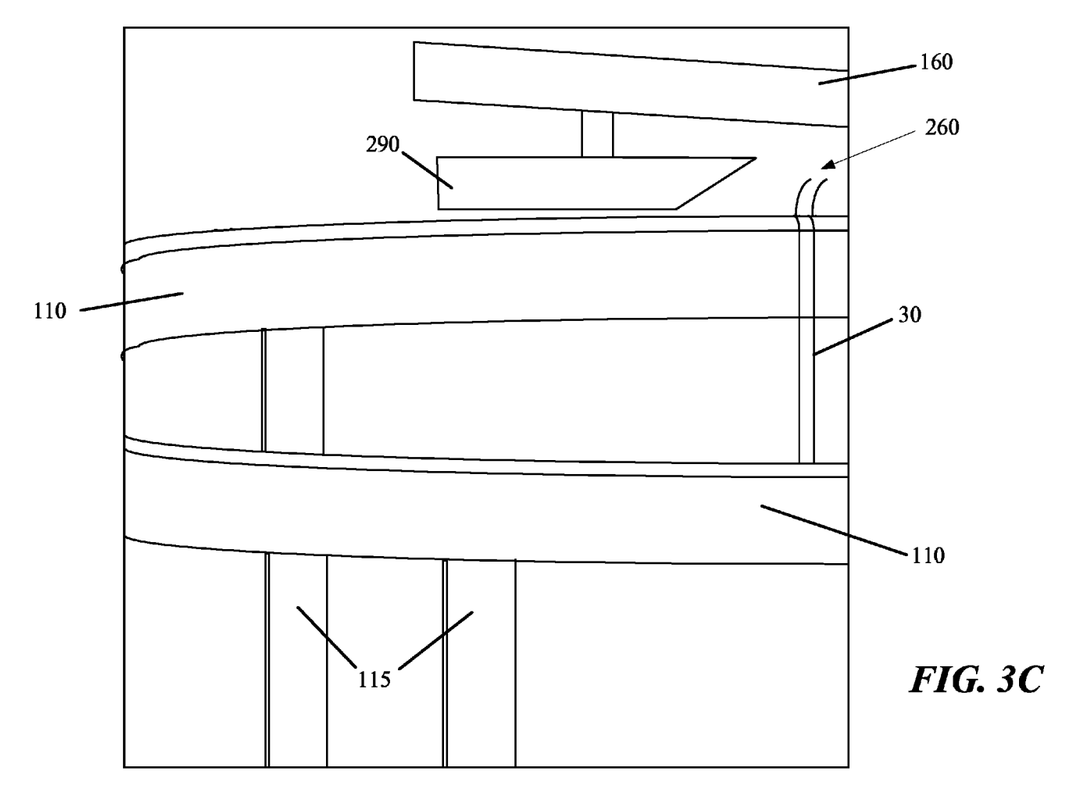
FIG. 3C is a detailed view of yet another portion of the panel former shown in FIG. 2.

Referring to FIGS. 2 and 3, an embodiment of the panel former 100 for forming a panel 10 will be described. According to this embodiment, the panel former 100 includes a drum 110 supported by a stand 115. The tubing 20 is wrapped around the drum such that support strips 30 can be welded to the tubing 20. In this embodiment, in order to facilitate continuous wrapping and guiding of tubing 20 around the drum 110, a motor 125 is provided to rotate an arm 160 about axis A. The arm 160 has a carriage 210 attached to it for guiding tubing 20 around the outer surface of the drum 110, as explained in more detail below.

A tube positioner 130 (FIG. 3A), such as a belt or strap, that is wrapped around the outer surface of the drum 110 can hold the tubing 20 in place between the outer surface of the drum 110 and the belt 130. In order to show other parts of the panel former 100, the belt 130 is not shown in FIG. 2. As shown in FIG. 3, the belt 130 is wrapped around and tensioned against the drum 110 except in one area in which the belt 130 is spaced apart from the drum by a roller 220 attached to one end of the rotatable arm 160. The belt 130 is spaced apart from the drum 110 in this area to allow the carriage 210 to move the tube position down along the outer surface of the drum 110 while introducing and guiding tubing 20 into position on the outer surface of the drum 110 under the belt 130. It will be understood that the belt 130 is wrapped around the drum 110 with enough tension to hold the tubing 20 in place between the drum 110 and the belt 130. The belt 130 holds the tubing 20 in place on the drum 110, thereby allowing the tubing 20 to be loosely wrapped and thereby facilitating the movement of the tubing 20 downward. Thus, when the arm 160 rotates, the carriage 210 and the roller 220, which are both attached to the arm 160, move with the arm 160 around the drum 110. In the embodiment shown in FIGS. 2 and 3, the arm 160 rotates in a clockwise direction when viewed from the top.

In some embodiments, a wheel 240 is attached to the arm 160 adjacent the radially inward side of the carriage 210 as shown in FIG. 3B. The wheel 240 travels along the top surface of the drum 110. As shown in FIG. 3B, the wheel 240 can be attached to the underside of the arm 160 at a point such that the wheel 240 rolls along the top surface of the drum 110 when the arm 160 and carriage 210 rotate. It will be understood that the wheel is not critical. In the illustrated embodiment, the wheel locates the vertical position of the carriage 210 and supports the structure, assuring that the tubing 20 being wrapped onto the drum 110 is precisely aligned with the heating devices. According to an embodiment, the heating devices are impulse heaters.

As shown in FIG. 3A, the carriage 210 has an aperture 230 through which tubing 20 is threaded. In the embodiment shown in FIGS. 2 and 3, as the carriage 210 moves around the drum 110 in a clockwise direction, the tubing 20 is pulled from a spool or directly from an extruder (not shown). In some embodiments, the spool is not part of the panel former 100. In other embodiments, the spool can be positioned on the panel former 100 above the arm 160 and is rotatable (in a manner similar to the spool 490 shown in the embodiment of FIG. 6).

The supports 30 may be formed of thin polymer strips that are welded directly to the surface(s) of the tubing 20. In one embodiment, the strips are impulse welded or heat sealed to the tubing 20. The amount of time required to weld the supports 30 to the tubing will vary with the characteristics of the support and tubing as well as the type and intensity of welding used, but generally plastic to plastic welds may be performed very quickly. By way of example, impulse welding of 0.006 inch thick polypropylene film supports to 3/16 inch diameter tubing can typically be performed in less than about 1-2 seconds. The supports 30 can be designed to be thinner or weaker than the tube wall, acting like a fuse and preventing potential leak-causing damage if the panel 10 is stressed.

Figure 7A:
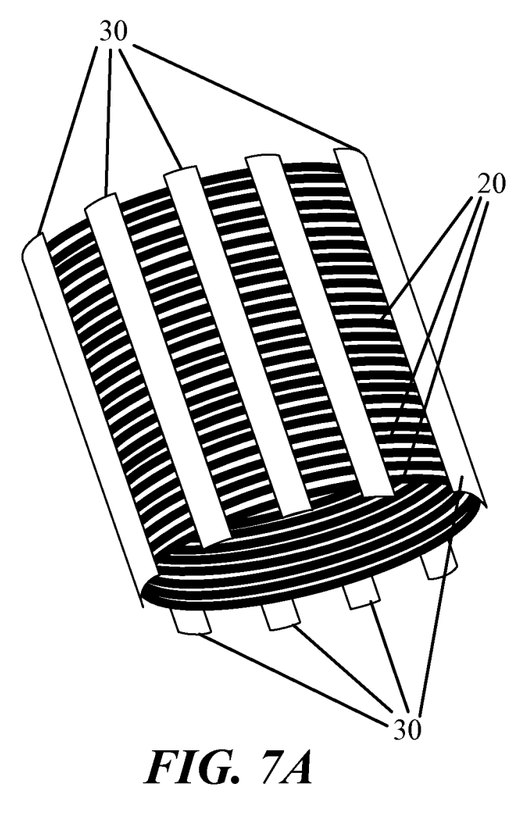
FIGS. 7A and 7B are perspective views of tubing after being welded to support strips.
Figure 7B:
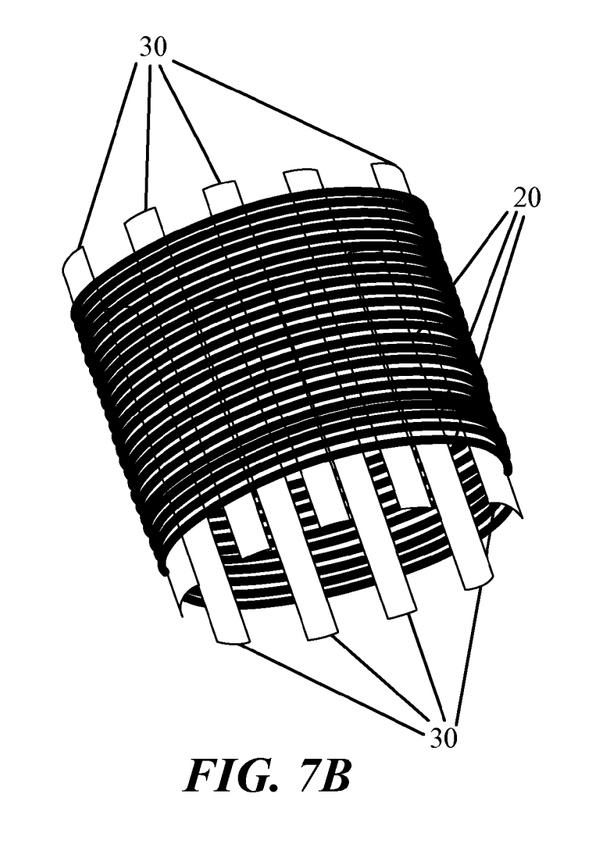

Multiple transverse support members 30 (film or extruded strips) are fed onto the outer surface of tubing 20 as the tubing 20 is wrapped around the outer surface of the drum 110. Each of these strips is associated with a heating/welding device 250, which can be an impulse heater. The number of support member strips 30 that are provided about the drum 110 and their relative spacing in any particular application will depend on the desired spacing of the support strips in the resulting sheets of tubing. In general, a heater (welding unit) 250 is provided for each support member strip. In the embodiment illustrated in FIG. 3B, each support member strip is fed from a position inside of the drum 110 over the top surface of the drum 110 so that it extends down on the outer side of the drum 110. The tubing 20 is wrapped around the drum 110 over the support member strips such that the support member strips are positioned between the drum and overlying tubing. Exemplary resulting tubing hoops with the welded support strips are shown in FIG. 7B.

As shown in FIG. 2, the welding unit/heaters 250 are positioned on the outer surface of the drum, with each heater 250 being positioned adjacent an associated support strips 30. According to an embodiment, the heaters on the outer surface of the drum are impulse heating strips 250. In one particular embodiment, the heating strips are rectangles that are about 1 inch long and about 0.25 inch wide.

The heaters 250 can be used to impulse weld the associated support strip 30 to the outer surface of the tubing 20 wrapped around the drum 110 when the heater(s) 250 are activated. In the illustrated embodiment, the heaters 250 are sequentially activated. Thus, according to this embodiment, when the tubing 20 is positioned around the drum 110 between the support strip 30 and the belt 130, the heater 250 can be activated to weld the strip to the tubing 20 to form the support member 30 of the panel 10. As shown in FIG. 1 and FIG. 7, which is discussed in more detail below, the strips 30 are oriented substantially orthogonal to the tubing 20.

In the illustrated embodiment, each support strip has an associated welding unit/heater 250 for welding a strip to the tubing 20 to form a support member 30. As shown in FIGS. 3A-3C, a switch 260 for activating the heater 250 can be positioned above the top surface of the drum 110 such that when a cam or paddle 290 travels around the drum 110 to the switch 260, it pushes down the switch 260 to activate the heater 250 to weld the strip 30 to the tubing 20. The cam or paddle 290 is attached to the arm 160 on the end opposite the end to which the carriage 210 is attached. Since cam or the paddle 290 is on the opposite end of the arm 160 from the carriage 210, the paddle 190 will be in an area where the tubing 20 is held in place against the drum 110 by the tensioned belt 130. This tension aids in the welding process as the belt 130 forces the tubing against the support strip 30 and drum 110 such that the support strip 30 can be welded to the tubing.

In this embodiment, as the cam or paddle 290 travels around the drum 110 to a switch 260, it pushes down the switch 260 to activate the heater 250. The switch 260 remains depressed (and the heater 250 remains activated) for the length of time it takes for the cam or paddle 290 to pass completely over the switch 260. This length of time, which corresponds to the amount of time suitable for the welding, can be adjusted by either increasing or decreasing the length of the bottom of the cam or paddle 290. It will be understood that the rate at which the arm 160 rotates also affects the length of time the heater 250 is activated. As shown in FIG. 3C, the cam or paddle 290 can be shaped to travel smoothly over the switch 260. Weld time can be sequential, or can be performed at several stations simultaneously, or can be electronically controlled by a computer.

Once a wrap of tubing 20 has been welded with support strips 30, it is indexed in a downward direction along the outer surface of the drum 110 so that a subsequent length of tubing 20 can be wrapped around the drum 110 and welded with support strips 30. On each rotation of the arm 160, the carriage 210, which can also act as a tube indexer, can move the welded tube 20 down along an the outer surface of the drum 100 a predetermined distance away from tubing 20 being dispensed while feeding a subsequent wrap of tubing 20 around the drum 110. The carriage 210 can be formed such that it is substantially flush against the outer surface of the drum 110. As shown in FIG. 2, the bottom edge of the carriage 210 can be shaped with an angle to guide and push tubing 20 down along the outer surface of the drum 110. In the embodiment shown in FIG. 2, this angled portion is on the lower left side of the carriage 210. It will be understood that, in this embodiment, the angle can be adjusted to increase or decrease the pitch of the tubing.

As the tubing 20 is pushed down the drum 110, tubing hoops with welded support strips 30 slide down along the outer surface of the drum 110 and eventually move down below the bottom of the drum 110. The tubing hoops 20 are removed from the panel former 100 and cut along a line that is substantially parallel to the support members 30 to form a sheet. The weld strips 30 are cut to remove the panel 10 from the panel former. The sheet can then be used as a panel 10 for a solar collector, heat exchanger, or other device.

It will be appreciated that the tube separation, support design, support separation, and tube bundle density of the panels 10 can all be adjusted using the panel former 100. The panel former 100 can also accept tubing of different sizes. In a particular embodiment, the diameter of the tubing 20 is in a range of about ⅛-½ inch. The thickness of the tubing 20 wall can be about 0.010 inch in an embodiment.

Thus, the diameter of the drum 110 will determine the length L of the panel 10 that is produced by the panel former 100. That is, the greater the diameter of the drum 110, the greater the length L of the panel 10.

Figure 4:
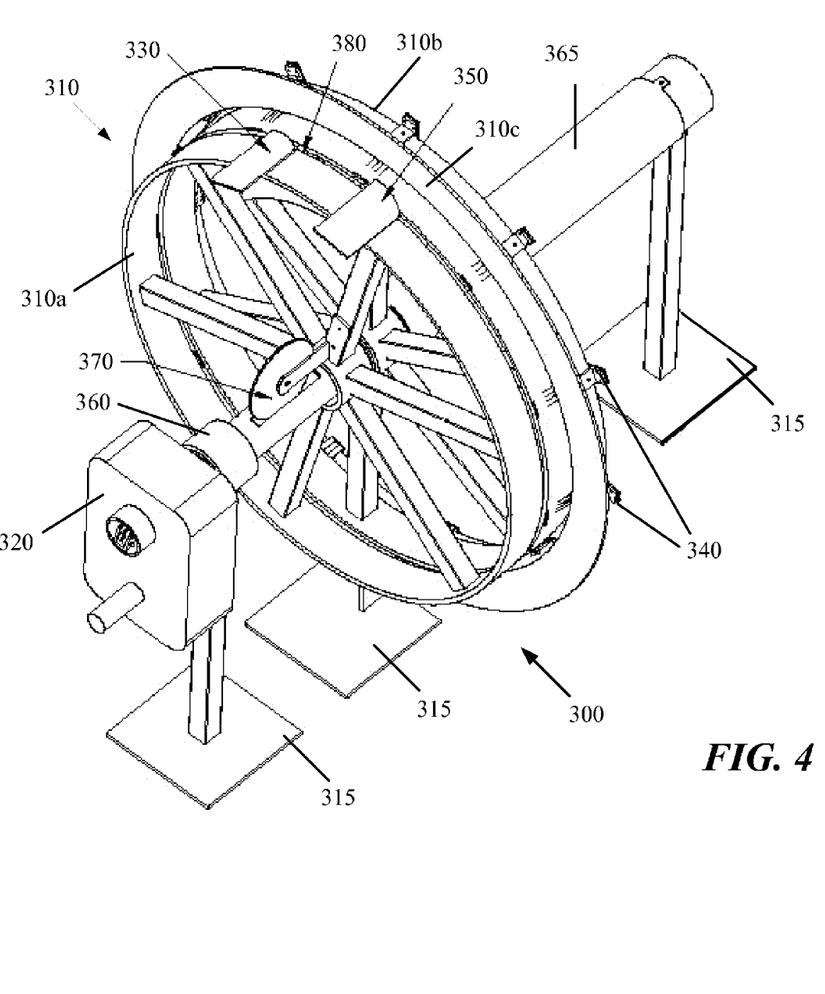
FIG. 4 is a perspective view of a panel former for forming solar collector panels in accordance with another embodiment.
Figure 5:
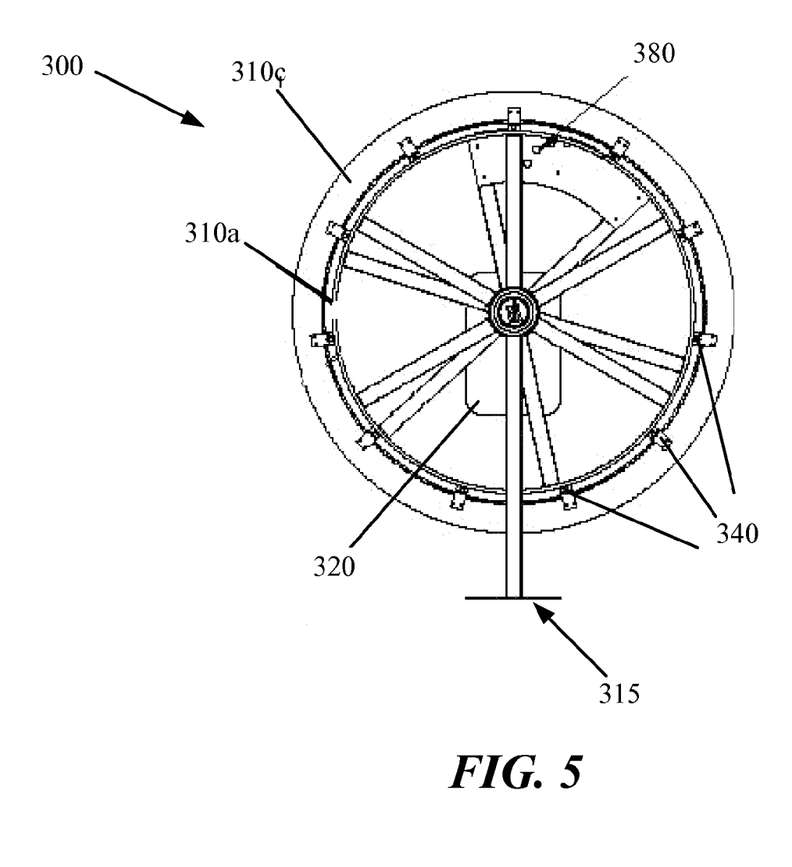
FIG. 5 is a side view of the panel former shown in FIG. 4.

Referring to FIGS. 4 and 5, another embodiment will be described. In this embodiment, the panel former 300 includes both a shaft 360 and a drum 310 that are rotatable. The drum includes a rotatable drum 310a, a fixed drum 310b, as well as a ring 310c. The tubing 20 is wrapped around the fixed drum 310b as it rotates off of the rotatable drum 310a while the ring 310c provides clamps 340. Heaters are mounted on the fixed drum 310b under the clamps 340 for welding support strips 30 to the tubing 20. Support strips 30 can also be mounted on the fixed drum 310b near an associated heater for welding to the tubing 20. Pulleys and cam followers can also be provided to guide the tubing 20 as it is wrapped around the drum 310.

According to this embodiment, the rotatable shaft 360 can include one or more pulleys 370 for guiding tubing 20 to be wrapped around the drum 310. Only one pulley 370 is illustrated in FIG. 4, but more than one pulley can be provided on the panel former 300 to guide the tubing 20. Features, such as, for example, cam followers 380, can also be provided to guide the tubing 20, as shown in the side view of FIG. 5. The rotatable drum 310a can be coupled with the shaft 360 such that when the shaft 360 is rotated, the rotatable drum 310a is also rotated. It will be noted that shaft 365 is fixed and does not rotate.

According to an embodiment, the panel former 300 can be fed tubing 20 directly from an extruder. Although not shown in the embodiment illustrated in FIG. 4, the panel former 300 can include a spool around which plastic tubing 20 is wound and from which the tubing 20 is dispensed to be wrapped around the drum 310. When the rotatable drum 310a rotates, it pulls the plastic tubing 20 from either the spool or directly from an extruder so that the tubing wraps 20 around the drum 310.

The panel former 300 can include a motor that can drive the shaft 360 and therefore the drum 310 and cause them to rotate. In some embodiments, the motor can be provided in the housing 320.

The tubing 20 is initially fed to rotatable drum 310a, which wraps the tubing 20 around the outer surface of the fixed drum 310b. Tube positioner 330 moves the tubing into place around the fixed drum 310b. For simplicity, only one tube positioner 330 is shown in FIG. 4. However, it will be understood that a number of tube positioners 330 can be positioned around the drum 310 to move the tubing 20 into place as it is wound around the outer surface of the fixed drum 310b.

According to an embodiment, a tube indexer 350 can move and position the tubing 20 along the surface of the fixed drum 310b toward the ring 310c. On each rotation of the shaft 360, the tube indexer 350 can move the tubing 20 along the surface of the fixed drum 310b along an axis parallel with the shaft 360 a predetermined distance away from the tubing source before feeding a subsequent wrap of tubing 20 around the fixed drum 310b.

When the tubing 20 reaches a set location under a friction clamp 340 (and heater) and weld strip 30, the weld strip 30 can be welded or heat sealed to the tubing 20. As noted above, the weld strip 30, which can be formed of extruded thin polymer strips, can be used to support the tubing 20 in the panel 10 (after the tubing 20 is cut, as described in more detail below).

Multiple transverse support members 30 (film or extruded strips) can be fed onto the outer surface of tubes 20 as they are wrapped around the outer surface of the fixed drum 310b. These strips 30 can be positioned a predetermined distance apart around the drum 310 and can be impulse welded to the outer tube surfaces. Thus, according to this embodiment, when the tubing 20 is positioned under the clamp 340 and the weld strip, the weld strip can be welded to the tubing 20 to form the support member 30 of the panel 10. FIG. 7A shows tubing hoops 20 with support strips 30 welded to the outer surface of the tubing 20.

Figure 6:
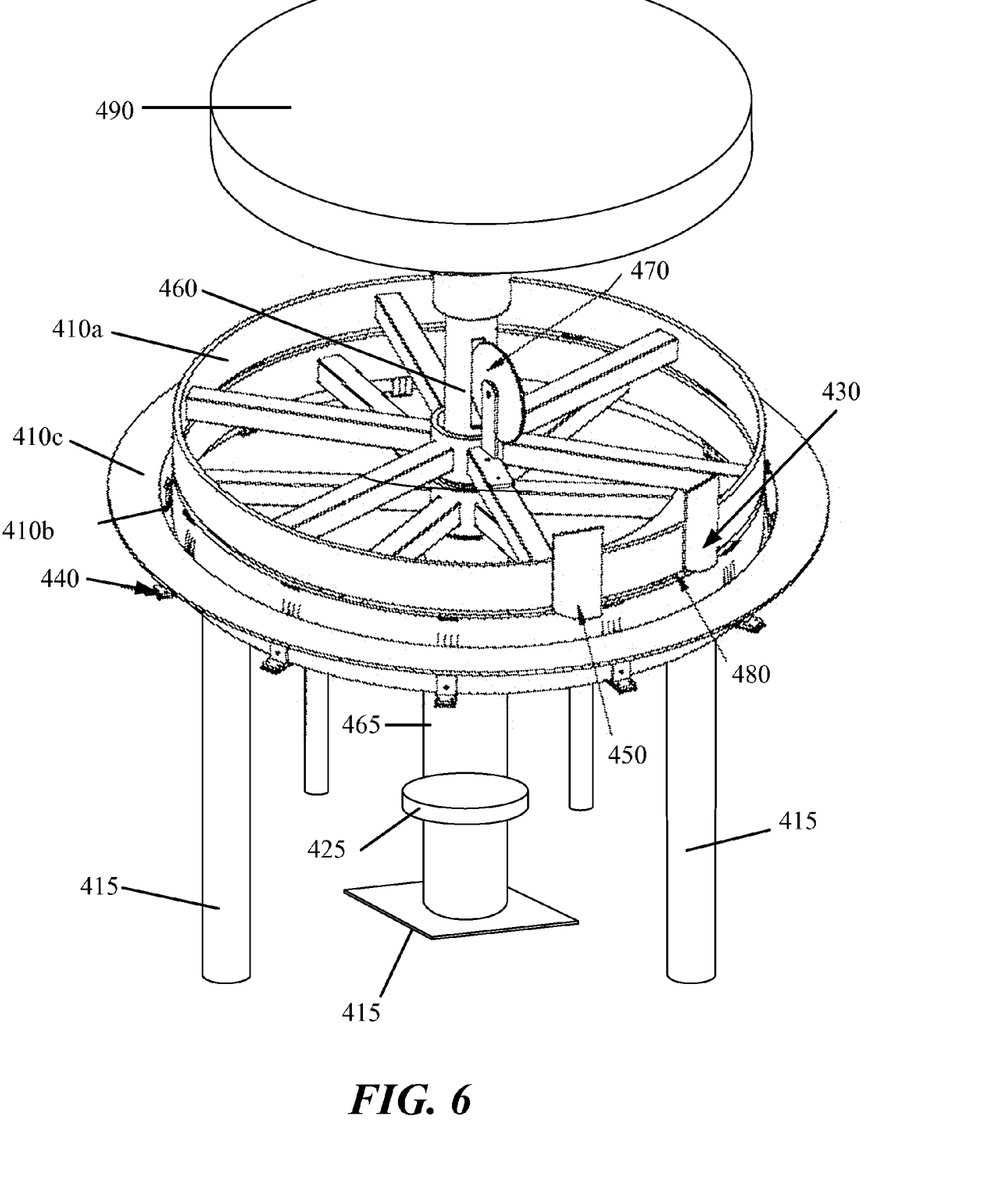
FIG. 6 is a perspective view of a panel former for forming panels in accordance with yet another embodiment.

Although the panel former 300 is shown in FIGS. 4 and 5 as being positioned on stand(s) 315 with the shaft 360 substantially parallel to a surface (e.g., floor) on which the stand (s) 315 are placed, it will be understood that the panel former 400 can be oriented, in another embodiment as shown in FIG. 6, such that a rotatable shaft 460 is substantially perpendicular to the surface on which the panel former 400 is placed. In such an embodiment, gravity can aid in moving the tube hoops down the drum 410 after the support members 30 have been welded to the tubing 20. In this embodiment, the tubing 20 source (e.g., a spool 490 or an extruder) can be positioned above the drum 410 and the motor 425 for rotating the shaft 460 can be positioned below the drum 410.

It will also be understood that, the motor 425 (FIG. 6) and housing 320, 420 need not be positioned as illustrated in FIGS. 4 and 6. The motor 425 can be positioned anywhere on the panel former 400 such that it can rotate the shaft 460. As shown in FIG. 6, the motor 425 does not necessarily need to be enclosed within a housing.

FIGS. 7A and 7B are perspective views of the tubing 20 after being welded to the support strips 30. FIG. 7A shows the strips 30 welded to the outside of the tubing 20 hoops. FIG. 7B shows the strips 30 welded to the inside of the tubing 20 hoops. The tubing 20 hoops are removed from the panel former and cut along a line that is substantially parallel to the support members 30 to form a sheet. The weld strips 30 are cut to remove the panel 10 from the panel former. The sheet can then be used as a panel 10 for a solar collector, heat exchanger, or other device. In some embodiments, the support members 30 are welded only to one surface of the tubing 20. In other embodiments, support members can be welded to both the top and bottom surfaces of the tubing 20.

In an alternative embodiment, the panel former 100, 300, 400 can be provided with a cutting device, such as a blade. After the supports 30 have been welded to the tubing 20, the cutting device can cut the tubing hoops along a line parallel to arm 160, 360, 460, thereby forming a panel 10 formed of welded tubing 20, as shown in FIG. 1. Cutting the tubing hoop can also prevent the wrapped tubing from slipping on the drum 310, 410.

Tubing separation can be adjusted from zero, where the tubes are immediately adjacent and touching each other, to several inches by adjusting the tube indexer. Although FIGS. 7A and 7B show the tubing hoops being spaced apart, the tubes can be welded to the support strips 30 such that the tubes are immediately adjacent one another in other embodiments. Thus, it will be understood that the produced tube bundles can have tubes that are either adjacent to or spaced from one another. The spacing can be adjusted during each rotation of the arm to produce a panel or heat exchanger with variable widths. For example, a heat exchanger where the tube separation at the tube ends are closer together allows tighter packing, which can be useful for attaching to a manifold, for example.

In a particular embodiment, the produced panel 10 has a length of about 12 to 30 feet and a width in a range of about one to eight feet. In this embodiment, the tubes 20 can be immediately adjacent one another or can be separated by up to about three inches. The support members 30 can be spaced apart by at least about two inches.

Figure 8:
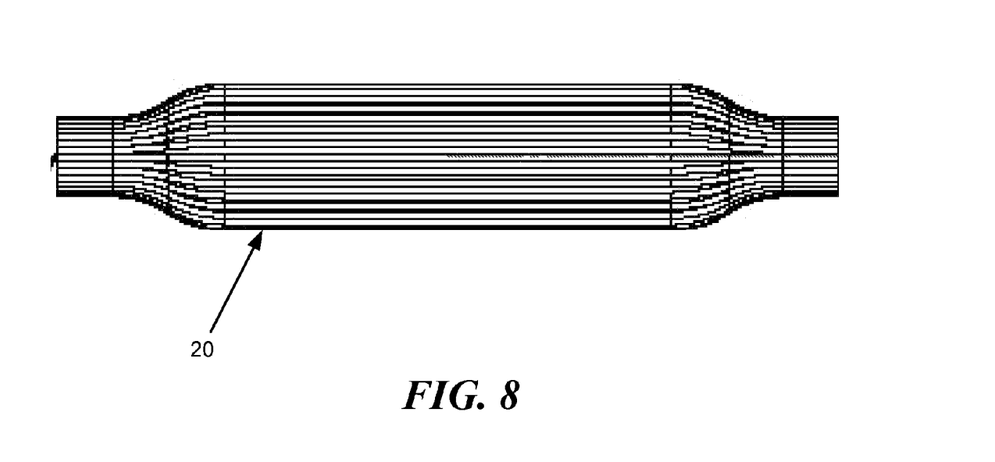
FIG. 8 shows an alternative panel configuration.

As noted above, the tube supports 30 can be welded on one or on both sides of the panel 10. The produced tube bundles can be used as planar or curved sheets, or rolled into cylindrical configurations using flexible tube supports to separate tubes. FIG. 8 shows an alternative panel configuration.

Figure 9:
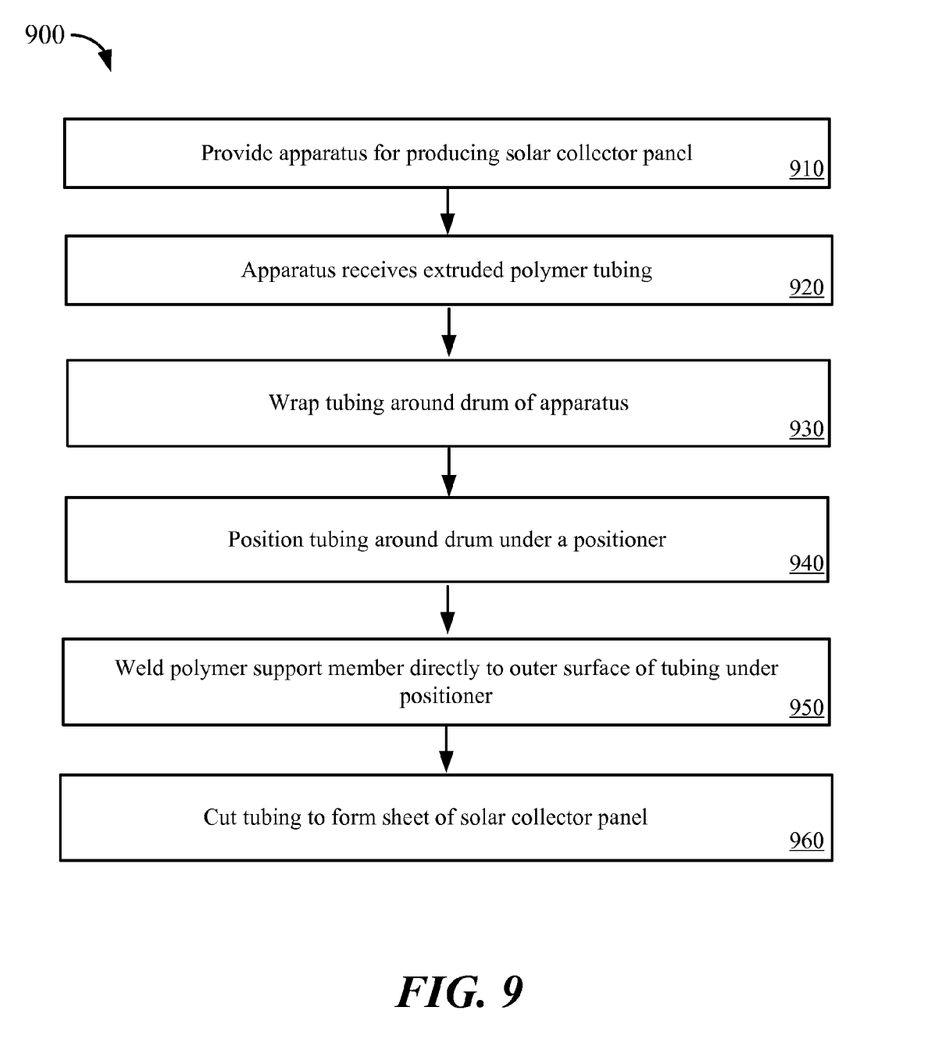
FIG. 9 is a flow chart of a method of producing a panel according to an embodiment.

FIG. 9 is a flow chart of a method 900 of producing a panel according to an embodiment. In 910, a panel former for producing the panel is provided. The panel former receives extruded polymer tubing in 920. The tubing can be received directly from an extruder or from another type of dispenser, such as a spool. In 930, the tubing is wrapped around a drum of the panel former. The tubing can be guided from the source by features, such as a carriage, pulleys and cam followers. A tube positioner, such as a strap or other biasing mechanism, can hold the tubing in place against the outer surface of the drum. In 940, the tubing is positioned under positioner. The positioner can be positioned to bias the tubing against the outer surface of the drum to hold it in place to be welded directly to a polymer support member positioned under the positioner in 950. After the support member(s) have been welded to the tubing, the tubing can be cut in 960 along a line substantially parallel to the support member to form a panel.

The described panels are very versatile and can be used in a wide variety of applications, including solar collectors and heat exchangers. In the described embodiments, water or an antifreeze solution can be used as the working fluid. However, it should be appreciated that a wide variety of other working fluids could be used.

Although only a few embodiments of the invention have been described in detail, it should be appreciated that the invention may be implemented in many other forms without departing from the spirit or scope of the invention. It should be apparent that the described heat exchangers and solar collector panels can be used in a wide variety of applications. In view of all of the foregoing, it should be apparent that the present embodiments are illustrative and not restrictive and the invention is not limited to the details given herein, but may be modified within the scope and equivalents of the appended claims.

What is claimed is:

1. A panel former for producing a panel formed of polymer tubing, the panel former comprising:
   a drum having an outer surface around which polymer tubing can be wrapped;
   a rotatable arm having a carriage attached thereto such that when the arm rotates, the carriage travels around the outer surface of the drum to guide the polymer tubing around the drum, wherein the carriage has an angled bottom edge that acts as a tube indexer for moving welded tube a predetermined distance along the outer surface of the drum as additional tubing is wrapped around inner drum; and
   a welding device having a heating element positioned on the outer surface of the drum and configured to weld a plurality of polymer supports to polymer tubing wrapped around the drum, the polymer supports being positioned between the welding device and the polymer tubing during welding and wherein the polymer supports are oriented substantially orthogonal to the tubing; and
   wherein the welding device is activated by a feature attached to the rotatable arm and the feature pushes down a switch to activate the welding device when the feature travels around the drum as the rotatable arm rotates.

2. The panel former as recited in claim 1, wherein the welding device is an impulse welder.

3. The panel former as recited in claim 1, further comprising a tube positioner for holding the tubing against an outer surface of the drum.

4. The panel former as recited in claim 3, wherein the tube positioner is a belt.

5. The panel former as recited in claim 1, further comprising a source of the tubing.

6. The panel former as recited in claim 5, wherein the source is an extruder.

7. The panel former as recited in claim 5, wherein the source is a spool around which tubing is wound.

8. The panel former as recited in claim 1, further comprising a cutting device for cutting the tubing along a line that is substantially parallel to the polymer supports.

9. A panel former for producing a panel formed of polymer tubing, the panel former comprising:
- a drum having an outer surface around which polymer tubing can be wrapped;
- a belt for holding the tubing against an outer surface of the drum;
- a rotatable arm having a carriage attached thereto such that when the arm rotates, the carriage travels around the outer surface of the drum to guide the polymer tubing around the drum; and
- a welding device having a heating element positioned on the outer surface of the drum and configured to weld a plurality of polymer supports to polymer tubing wrapped around the drum, the polymer supports being positioned between the welding device and the polymer tubing during welding and wherein the polymer supports are oriented substantially orthogonal to the tubing; and
- a roller attached to the rotatable arm, wherein the belt is wrapped around the drum and the roller such that a portion of the belt is spaced apart from the drum by the roller, wherein the welding device is activated by a feature attached to the rotatable arm and the feature pushes down a switch to activate the welding device when the feature travels around the drum as the rotatable arm rotates.

10. A panel former for producing a panel formed of polymer tubing, the panel former comprising:
- a drum having an outer surface around which polymer tubing can be wrapped;
- a belt for holding the tubing against an outer surface of the drum;
- a rotatable arm having a carriage attached thereto such that when the arm rotates, the carriage travels around the outer surface of the drum to guide the polymer tubing around the drum to form a plurality of tubing hoops;
- a roller attached to the rotatable arm, wherein the belt is wrapped around the drum and the roller such that as the rotatable arm rotates about the drum, a portion of the belt adjacent the roller is spaced apart from the drum by the roller, wherein the carriage is arranged to feed the tubing around the outer surface of the drum in an area where the belt is spaced apart from the drum as the rotatable arm rotates around the drum;
- a welding device configured to weld a plurality of polymer supports to the polymer tubing hoops wrapped around the drum, wherein the polymer supports are oriented substantially orthogonal to the tubing; and
- wherein the carriage further includes a structure that pushes the welded tubing hoops positioned under the belt downward along the outer surface of the drum relative to the belt such that as multiple subsequent hoops are added, at least one hoop will move downward below the belt.

11. The panel former of claim 10, wherein the carriage moves a welded tubing hoop a predetermined distance away from tubing being dispensed while feeding a subsequent wrap of tubing around the outer surface of the drum.

12. The panel former of claim 10, wherein the carriage has an angled bottom edge for moving the tubing down along the outer surface of the drum.

13. The panel former of claim 10, wherein the carriage has an aperture through which the tubing passes.

14. The panel former of claim 10, wherein the welding device has a heating element positioned on the outer surface of the drum.

15. The panel former of claim 10, wherein the welding device is activated by a feature attached to the rotatable arm.

16. A panel former for producing a panel formed of polymer tubing, the panel former comprising:
- a drum having an outer surface around which polymer tubing can be wrapped;
- a rotatable arm having a carriage attached thereto such that when the arm rotates, the carriage travels around the outer surface of the drum to guide the polymer tubing around the drum, wherein the carriage also acts as a tube indexer configured to move wrapped tubing down along the outer surface of the drum a predetermined distance from tubing being dispensed; and
- a welding device configured to weld a plurality of polymer supports to polymer tubing wrapped around the drum, wherein the polymer supports are oriented substantially orthogonal to the tubing, and wherein the welding device is activated by a cam or a paddle attached to the rotatable arm on an end opposite to an end on which the carriage is attached.

17. The panel former of claim 16, wherein the cam or the paddle pushes down a switch to activate the welding device when the feature travels around the drum as the rotatable arm rotates.

18. The panel former of claim 16, further comprising a belt wrapped around the drum for tensioning the tubing against the outer surface of the drum.

19. The panel former of claim 16, further comprising a cutting device for cutting the tubing along a line that is substantially parallel to the polymer supports.

20. The panel former of claim 16, wherein the tubing is provided by an extruder.

21. A panel former for producing a panel formed of polymer tubing, the panel former comprising:
- a drum having an outer surface around which polymer tubing can be wrapped;
- a rotatable arm having a carriage attached thereto such that when the arm rotates, the carriage travels around the outer surface of the drum to guide the polymer tubing around the drum, wherein the carriage also acts as a tube indexer configured to move wrapped tubing down along the outer surface of the drum a predetermined distance from tubing being dispensed, wherein the carriage has a bottom edge shaped with an angle to push the tubing down, wherein the angle can be adjusted to vary a pitch of the tubing; and
- a welding device configured to weld a plurality of polymer supports to polymer tubing wrapped around the drum, wherein the polymer supports are oriented substantially orthogonal to the tubing.

* * * * *